Patented July 26, 1949

2,477,349

UNITED STATES PATENT OFFICE 2,477,349

STABILIZED VINYL RESIN

William R. Richard, West Springfield, Mass., assignor to Monsanto Chemical Company, St. Louis, Mo., a corporation of Delaware No Drawing. Application December 29, 1945,
Serial No. 638,468

7 Claims. (Cl. 260—45.75)

This invention relates to the art of stabilizing vinyl resins. More particularly, this invention relates to preventing the deterioration of halogen-containing vinyl resins.

The stabilization of halogen-containing vinyl resins has presented a serious problem, particularly when it is desired to manufacture light colored, transparent articles that do not discolor on heating. Many types of stabilizing materials have been suggested for preventing deterioration of such polymeric products but while some have effected substantial improvement, there has still been much to be desired in the results obtained.

It is an object of this invention to provide halogen-containing vinyl resin compositions having improved resistance to deterioration. A particular object of this invention is to provide halogen-containing vinyl resin compositions having increased resistance to discoloration at elevated temperatures.

These and other objects are accomplished according to this invention by incorporating a mixture of 0.10–0.40 part by weight of triethyl lead hexyl maleate and at least 0.75, and preferably 0.75–1.75, parts by weight of dibutyl diphenyl tin in 100 parts by weight of a halogen-containing vinyl resin.

The following examples are illustrative of the products of the invention but are not to be construed at limitative thereof. Where parts are given they are parts by weight.

Example I 2.5 parts of triethyl lead hexyl maleate and 10 parts of dibutyl diphenyl tin are mixed with 1000 parts of a vinyl chloride-vinyl acetate copolymer (containing 88% vinyl chloride) by milling on rolls at a temperature of 115° C. for 3 minutes. The resulting composition is molded into disks 0.075 inch in thickness by pressing for 1 minute at a temperature of 150° C. The molded disks are transparent and colorless.

In contrast to the product described above, a product differing only in that 12.5 parts of dibutyl diphenyl tin are used in place of the mixture of stabilizers in the example, is found to have a brownish yellow cast after being subjected to the same mixing and molding conditions. In fact, the product described in Example I is still colorless after 5 minutes heating at 150° C. and even after 15 minutes at 150° C. has better color than the above described product containing dibutyl diphenyl tin as the sole stabilizer.

In further contrast to the product described in Example I, a product differing only in that 12.5 parts of triethyl lead hexyl maleate are used in place of the mixture of stabilizers in the example, is found to be opaque after being subjected to the same mixing and molding conditions. If smaller amounts of the lead compound are used so that a clear product is obtained, rapid discoloration occurs on heating.

Example II

Example I is repeated except that a heteropolymer of vinyl chloride and diethyl maleate (90% vinyl chloride) is substituted for the vinyl chloride-vinyl acetate copolymer. Similar improvement in heat-stabilization and clarity is attained by use of the mixture of organo-metallic compounds in place of the individual compounds.

It is apparent from the foregoing results that surprising and greatly improved effects are obtained by using a mixture of dibutyl diphenyl tin and triethyl lead hexyl maleate in place of the individual compounds in producing transparent and heat stable halogen-containing vinyl resin compositions. Among other advantages, the use of the stabilizer of the invention permits halogen-containing vinyl resins to be processed into sheets and other articles without discoloration.

In place of the resins used in the examples, similar improvements may be effected by incorporating the mixed stabilizer of the invention in other halogen-containing vinylidene resins made from $CH_2=C=$group-containing compounds, numerous examples of which are well-known to those skilled in the art. Examples of vinylidene compounds from which such resins may be made include vinyl chloride, vinylidene chloride, vinyl chloracetate, chlorostyrenes, chlorobutadiene, etc.

Such vinylidene compounds may be polymerized singly or in admixture with these or other halogen-containing vinylidene compounds or with vinylidene compounds free from halogen, such as vinylidene acetate, methyl acrylate, methyl methacrylate, styrene, etc. The mixed stabilizer of the invention is particularly effective with heteropolymers of vinyl chloride and diethyl maleate or other esters of maleic or other alpha, beta, unsaturated polycarboxylic acids such as fumaric acid, citraconic acid, aconitic acid, etc. The proportion of vinyl chloride in the copolymers or heteropolymers may be substantially varied but usually amounts to 50% or more of the polymeric product.

The mixed-stabilizer of the invention is also effective when intimately mixed with halogen-containing resins in which part or all of the halogen is introduced into preformed resin, e. g., chlorinated polyvinyl acetate, chlorinated polystyrene, chlorinated polyvinyl chloride and the like. Usually chlorine is introduced into the preformed resin by treatment in the presence of a softening agent for the resin.

The stabilizer mixture of the invention is also effective in vinyl resins containing halogens other than chlorine, e. g., bromine.

The proportion of dibutyl diphenyl tin in the stabilizer mixture is preferably from 0.75 to 1.75 parts per 100 parts of halogen-containing vinyl resin as pointed out above. While larger amounts may be used, e. g., 2-5 parts, without a detrimental effect from the standpoint of stabilization, such larger amounts are not necessary in producing colorless products as is shown by the examples given above.

It is to be understood that the above description is given by way of illustration only, and not of limitation, and that deviations are possible within the spirit of the invention.

What is claimed is:

1. A composition resistant to the discoloring effects of heat comprising 100 parts of a halogen-containing vinylidene resin in which the halogen is selected from the group consisting of chlorine and bromine intimately combined with 0.10–0.40 part of triethyl lead hexyl maleate and 0.75–5 parts of dibutyl diphenyl tin.

2. A composition as defined in claim 1 in which the halogen-containing resin is a vinyl halide-containing resin.

3. A composition resistant to the discoloring effects of heat comprising 100 parts of a chlorine-containing vinylidene resin intimately combined with 0.10–0.40 part of triethyl lead hexyl maleate and 0.75–5 parts of dibutyl diphenyl tin.

4. A composition as defined in claim 3 in which the chlorine-containing resin is a vinyl chloride-containing resin.

5. A composition resistant to the discoloring effects of heat comprising polyvinyl chloride intimately combined with 0.10–0.40 part of triethyl lead hexyl maleate and 0.75–1.75 parts of dibutyl diphenyl tin for every 100 parts of polyvinyl chloride.

6. A composition resistant to deterioration on heating comprising a copolymer of vinyl chloride and diethyl maleate intimately combined with a mixture of 0.10–0.40 part of triethyl lead hexyl maleate and 0.75–1.75 parts of dibutyl diphenyl tin for every 100 parts of vinyl chloride copolymer.

7. A composition resistant to deterioration on heating comprising a vinyl chloride-vinyl acetate copolymer intimately combined with a mixture of 0.10–0.40 part of triethyl lead hexyl maleate and 0.75–1.75 parts of dibutyl diphenyl tin for every 100 parts of vinyl chloride copolymer.

WILLIAM R. RICHARD.

REFERENCES CITED

The following references are of record in the file of this patent:

UNITED STATES PATENTS

| Number | Name | Date |
|---|---|---|
| 2,307,157 | Quattlebaum et al. | Jan. 5, 1943 |